T. WALLACE.
MATTRESS.
APPLICATION FILED MAY 17, 1920.
1,395,879.
Patented Nov. 1, 1921.
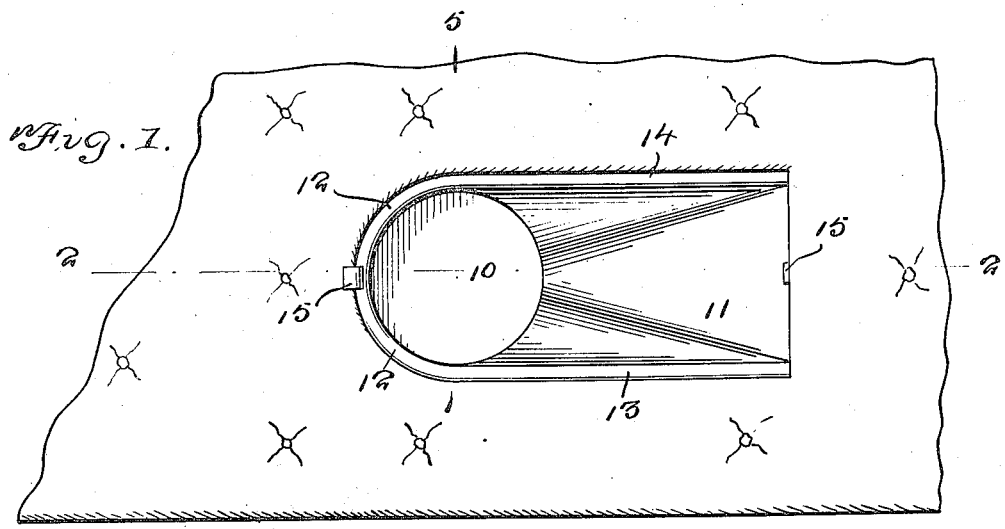
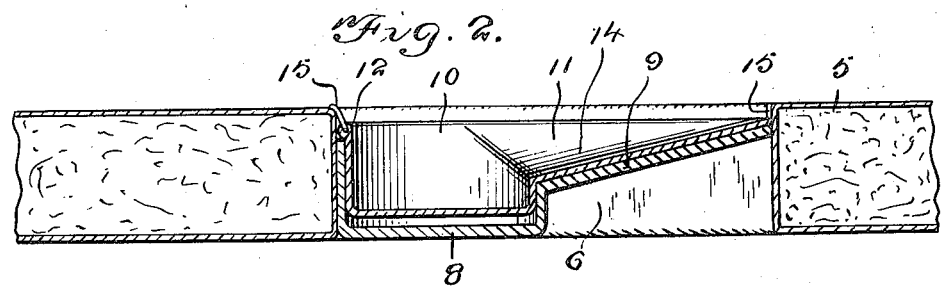
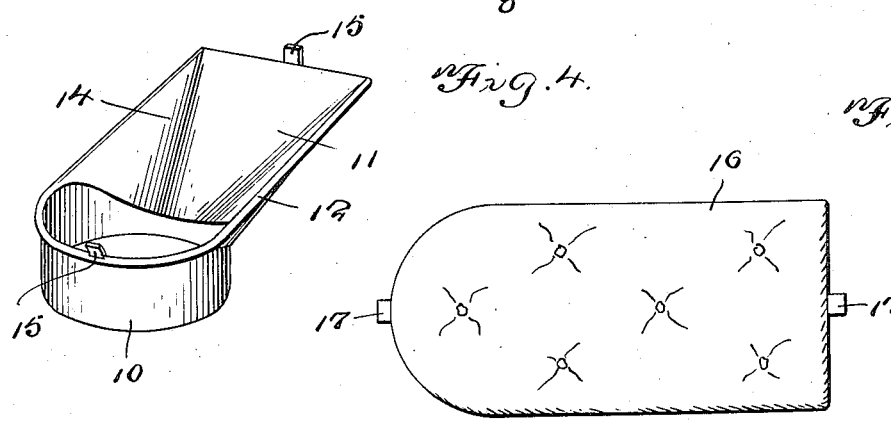
WITNESS:
E. Q. Guppert.
INVENTOR.
BY Tirzah Wallace
Victor J. Evans
ATTORNEY.

UNITED STATES PATENT OFFICE.

TIRZAH WALLACE, OF TOPEKA, KANSAS.

MATTRESS.

1,395,879. Specification of Letters Patent. Patented Nov. 1, 1921.

Application filed May 17, 1920. Serial No. 381,983.

*To all whom it may concern:*

Be it known that I, TIRZAH WALLACE, a citizen of the United States, residing at Topeka, in the county of Shawnee and State of Kansas, have invented new and useful Improvements in Mattresses, of which the following is a specification.

This invention has reference to a mattress. An object is to construct a mattress with a bed pan attachment having a removable tufted cover which when applied lies flush with the mattress and wholly conceals the pan.

A further object is to construct a mattress with a bowl-like receptacle having an angularly disposed longitudinally extending concaved apron communicating with the top thereof, and a removable pan having a trough extension designed to be seated in the receptacle and apron therefor to arrange the same below the surface of the mattress, and likewise to provide a tufted cover which will rest on the receptacle and in the apron therefor to arrange the said cover flush with the top of the mattress when the pan is removed. These objects may be accomplished by a simple construction and arrangement of parts such as is illustrated by the drawings.

In the drawings:

Figure 1 is a plan view of a mattress constructed in accordance with this invention.

Fig. 2 is a longitudinal sectional view on the line 2—2 of Fig. 1.

Fig. 3 is a view of the removable cover.

Fig. 4 is a perspective view of the pan and trough.

Referring now to the drawings in detail the numeral 5 designates a portion of an ordinary mattress. The mattress either in the course of construction or thereafter is provided with an opening 6 that has one of its walls rounded.

In the opening 6 I arrange a receptacle 8 which is round in plan and which contacts with the rounded wall of the opening. The receptacle has an upwardly inclined extension which is in the nature of a concaved apron. The apron 9 fills the remainder of the opening 6. The upper edges of the receptacle and apron are disposed a considerable distance below the upper face of the mattress, and the receptacle and apron are secured in the opening 6 in a manner to reinforce the walls provided by the said opening, and also for retaining the said walls in proper spaced relation to each other. If desired the receptacle and its apron may be removably associated with the mattress.

The receptacle and its apron support a pan 10 and a trough like extension 11 for the pan. The pan is round in plan, and the trough has a concave outer surface 14 so that the same snugly rests on the upper concave face of the apron 9. The edges of the trough and outer periphery of the pan 10 are beaded as at 12, and these beads rest on the upper edge of the receptacle 8 and the side edges of the apron. The pan and trough are positioned a suitable distance below the top of the mattress, and as these associated elements are removable they are both provided with out-standing tabs 15.

When the pan and trough are not in use, or when the pan and trough have been removed from the mattress, the opening 6 is covered by a tufted member 16, illustrated in Fig. 3 of the drawings. This member has its ends provided with tabs 17 whereby the same may be readily handled, and when in position is disposed flush with the upper surface of the mattress.

It is thought that the foregoing description, when taken in connection with the drawings, will set forth the construction and arrangement of the improvement without further detail description.

Having thus described the invention, what I claim is:—

1. The combination, a removably supported receptacle having an extension whose lower wall is upwardly inclined and which is rounded in cross section extending from one side of the receptacle and providing an apron, and a pan designed to rest in the receptacle having a trough extension received in the apron and having beaded edges which rest on the upper edges of the receptacle and the apron.

2. The combination, a receptacle which is round in plan and which is concaved at one of its ends from its sides and formed at the said concaved portion and at the said sides with an upwardly extended portion providing an apron, and a pan which is round in plan designed to be received in the receptacle and having one of its edges concaved from its sides and extended upwardly and outwardly to provide a trough, said pan having its upper edge beaded, and the edges of the trough being likewise beaded, said beaded edges resting on the upper edge of the receptacle and the apron therefor, and tabs on the end of the pan and on the end of the trough whereby the same may be raised from the receptacle.

3. A bed pan comprising a member which is round in plan and which has one of its edges rounded downwardly from the sides thereof, and an extension integrally formed on the said edge, said extension being inclined upwardly, said pan having its upper edge beaded and the sides of the trough being likewise beaded, and tabs on the end of the trough and on the upper end of the pan.

In testimony whereof I affix my signature.

TIRZAH WALLACE.